United States Patent
Alcock et al.

(10) Patent No.: US 8,046,780 B1
(45) Date of Patent: Oct. 25, 2011

(54) EFFICIENT PROCESSING OF ASSETS WITH MULTIPLE DATA FEEDS

(75) Inventors: Andrew Edward Savige Alcock, Singapore (SG); Andrew Gill, Singapore (SG); Ronnachai Chinowutthichai, The Beaumont (SG); Kin Onn Low, Singapore (SG)

(73) Assignee: Savi Technology, Inc., Mountain View, CA (US)

( * ) Notice: Subject to any disclaimer, the term of this patent is extended or adjusted under 35 U.S.C. 154(b) by 1464 days.

(21) Appl. No.: 11/282,227

(22) Filed: Nov. 18, 2005

Related U.S. Application Data (60) Provisional application No. 60/719,326, filed on Sep. 20, 2005.

(51) Int. Cl.
*G06F 9/44* (2006.01)
*G06F 15/173* (2006.01)
(52) U.S. Cl. ........................................ 719/330; 709/226
(58) Field of Classification Search .................. 719/330; 709/226
See application file for complete search history.

(56) References Cited

U.S. PATENT DOCUMENTS

| 6,058,389 | A | 5/2000 | Chandra et al. | |
|---|---|---|---|---|
| 2001/0021913 | A1 | 9/2001 | Leymann et al. | |
| 2002/0184070 | A1 * | 12/2002 | Chen et al. | 705/9 |
| 2003/0009511 | A1 | 1/2003 | Giotta et al. | |
| 2003/0093521 | A1 | 5/2003 | Schlonski et al. | |
| 2003/0101128 | A1 * | 5/2003 | Abernethy | 705/37 |
| 2003/0110230 | A1 | 6/2003 | Holdsworth et al. | |
| 2003/0229559 | A1 | 12/2003 | Panttaja et al. | |
| 2005/0058263 | A1 | 3/2005 | Frazier | |
| 2005/0145688 | A1 | 7/2005 | Milenkovic et al. | |
| 2006/0253590 | A1 * | 11/2006 | Nagy et al. | 709/226 |
| 2007/0050261 | A1 * | 3/2007 | Lin | 705/22 |

OTHER PUBLICATIONS

United States Office Action, U.S. Appl. No. 11/283,226, May 26, 2010, 15 pages.
United States Office Action, U.S. Appl. No. 11/283,226, Oct. 28, 2009, 16 pages.

* cited by examiner

*Primary Examiner* — Andy Ho
*Assistant Examiner* — Abdou K Seye
(74) *Attorney, Agent, or Firm* — Fenwick & West LLP (57) ABSTRACT

A system and method provides efficient message processing of assets by placing all messages in a queue as they are received from an information feed. Messages are grouped according to the entities with which they are associated and messages within each group are sorted according to the time the message was generated by the information feed. Messages are processed in the order in which they were generated using a system that accounts for delayed or out-of-order messages by evaluating the message state, comparing it to the last stored state, and delaying the processing of messages arriving ahead of earlier-generated messages.

13 Claims, 7 Drawing Sheets

EFFICIENT PROCESSING OF ASSETS WITH MULTIPLE DATA FEEDS

RELATED APPLICATIONS

This application claims priority under 35 U.S.C. §119 from U.S. Provisional Application Ser. No. 60/719,326, filed Sep. 20, 2005, entitled "Method for Efficient Processing of Assets in an Asset Management System"; and is related to U.S. patent application Ser. No. 11/283,226, filed Nov. 18, 2005, entitled "Partially Ordered Queue for Efficient Processing of Assets," each of which is incorporated herein by reference.

BACKGROUND OF THE INVENTION

1. Field of the Invention

The present invention relates to processing asset information efficiently, and more particularly, to efficient processing of assets in an asset management system.

2. Description of the Related Art

Many asset management systems receive high-volume information feeds consisting of individual messages that report asset movements, change of state or confirmation of unchanged state, aggregations and disaggregations with other assets, and the like.

In a simple asset management system, each message or update is about a unique "atom" or object. Thus, the transaction processing a single message needs to lock only the single object to which the message refers. However, for a system managing a large number of assets with various attributes and states, a message may be about an asset, but the asset may be related (possibly by containment or a physical linkage) to other assets; those assets that are related to one another are known as an "aggregation" as will be more fully defined below.

To process information feeds with aggregated data, the asset management system needs to process a very large number of updates per second; to achieve this, the updates are processed in many concurrent threads. The updates frequently are processed on a "cluster" of separate computers and the data is held and processed, for example on a relational database.

Conventionally, such a system uses a message queue to process the high-volume information feeds. Standard message queues allow multiple sources of information to be received, aggregated, and distributed efficiently to many different nodes in a cluster, and to many threads in each node. A message queue distributes messages as fast as possible to any thread waiting to process a message.

However, when messages about the same object are received by the system at about the same time, two problems arise: concurrent updating and ordering.

The problem associated with concurrent updating arises when separate threads are processing information about the same entity. In these circumstances, it becomes critical that no two threads attempt to update the same data record at the same time. If this condition occurs, the data is likely to become corrupt, causing the system to behave incorrectly.

One conventional approach to resolving the concurrent update problem is locking the rows that each transaction needs to update. Locking may take the form of pessimistic or optimistic locking.

In pessimistic locking, a transaction locking a row locks out access to that row to all other transactions that want to read, modify, or lock that row. All other transactions wanting to access the row in any way must wait until the transaction that owns the lock releases it. This scheme can lead to a state known as "deadlock." Consider an example in which a first transaction needs rows 1 & 2, and a second transaction needs rows 1 & 2. If the first transaction gets a lock on row 1 and the second transaction gets a lock on row 2, both transactions will wait indefinitely for the row each transaction is missing. Avoiding this sort of deadlock in a pessimistic locking scheme requires complicated, custom, and hard-to-debug code in a system. One known approach is to ensure that threads always take out locks on rows in the same order. However, doing so can be difficult if not impossible when complex, dynamic relationships exist between the objects that need to be locked. In addition, pessimistic locking reduces system throughput when many transactions are queued up waiting for a lock on the same row.

In optimistic locking, many transactions can have a lock on the same row at once, on the theory that potential problems are detected when updates are issued to the database. This process is implemented by logic to detect when a row with a lock on it has changed. If the system detects that a change has been made to a row, it will either fail the transaction or back out of the transaction and restart it. In a system in which conflict for rows is low, this process will maximize throughput. However, whenever there is conflict, all but one transaction is guaranteed to fail. Failure can be expensive, especially in terms of CPU and resource cost. Not only does each failed transaction has to roll back all the updates that it made up to backing out, which is typically several times the cost of making the update, but the transaction also has to be performed for a second time. Thus, high-volume information feeds cannot be supported well by either a pessimistic or optimistic locking scheme.

Another problem arises for messages processed out of order. Conventionally, threads are not deterministically scheduled by operating systems, and very rarely between different computers. As a result, two messages about a single asset that are received from the information feed at about the same time may be executed by different threads in different orders. For example, if the two messages are M1 at time t and M2 at time t+1, M1 may be processed first, followed by M2 or vice versa. Therefore, if M2 is processed first, the processing will not benefit from the knowledge in message M1. This misordering may cause the system to believe that there is a business exception. As a result of processing the messages out of order, the state of the system becomes invalid.

In addition, the ordering problem is exacerbated by the ability of the message queue to distribute messages extremely quickly to many different threads. For example, imagine that a group of twenty messages arrive into a queue, where the first and last (twentieth) concern the same asset. A conventional message queue would distribute each message to one of ten threads on each of two computers in a cluster, and it would do so nearly simultaneously. Given a small randomness in the behavior of threads, it is quite possible for the last (twentieth) message to start processing before the first message. As a result, the last message would own the lock on the database for the rows associated with the asset, guaranteeing that the first message will be either processed after the last message (using pessimistic locking), or fail (using optimistic locking).

In addition, traditional, simple systems make no attempt to recover from the errors or invalid states that are caused by such misordering. As a result, the quality and accuracy of the data in these systems are low.

Other conventional systems attempt to handle out-of-order messages by inferring missed messages. For example, when such a system receives a message, the system can infer that there is one or more missing, earlier message(s). The system could then "compensate" for the missing message(s) by filling in with a tentative, inferred message. Then, when a message arrives that matches an inferred message, the system would remove the inferred message, replacing it with the known message. Alternatively, if a message arrives that occurred between two messages that have been previously processed, the processed messages are modified and the new message inserted between them. However, this method is complex and costly in terms of processing, disk, and network overheads compared to the processing performed if the messages had arrived in the correct order.

Another conventional solution to this problem is to decrease the number of messages that a message queue will dispatch at any one time. However, this approach only reduces the likelihood of messages being processed out of order, unless the system as a whole processes only a single message at any one time. This approach is only suitable for systems with very low numbers of messages being received, thus, would not be effective for processing a very large number of updates per second.

A further complication of using an asset management system as described herein is the fact that an asset may be related (possibly by containment or a physical linkage) to other assets; those assets that are related to one other are known as an aggregation. Conceptually, therefore, several messages about different assets may in fact be messages about the same asset aggregation. Locking and ordering within the system must take these aggregations into account to prevent data integrity failures. This is in contrast to a simple message processing system, in which each message is about a unique atom or object.

SUMMARY OF THE INVENTION

The present invention provides a method for efficient message processing in an asset management system. To accomplish this, the system and method places all messages in a queue as they are received from an information feed. Because the system has intimate knowledge of the relationships between assets and other business entities, messages in the queue are grouped into partial orders according to the aggregations and entities they are associated to, or the asset itself if the asset is not part of an aggregation. Partial orders, as used herein, are a subset of messages that are totally ordered within an entire partially ordered set, which includes all messages in the queue. Business entities, as used herein, may be assets, documents, groupings, or tags.

The messages within each group are sorted according to the time the message was generated by (and not received from) the information feed, or more specifically, the time that the tag reader read the tag corresponding to the message. Then, the messages within each group are processed in the order in which they were generated; there is at most a single message being processed from each partial order at any one time, and that message is the one with the earliest timestamp. In the event that two messages share exactly the same timestamp, the system may choose additional fields to provide ordering or may arbitrarily choose an ordering according to various embodiments of the invention. In addition, using its knowledge of the relationships between assets, the system is configured to handle delayed or out-of-order messages by holding them until the earlier-generated message(s) is/are received.

DETAILED DESCRIPTION OF THE EMBODIMENTS

State and Terminology

Figure 1:
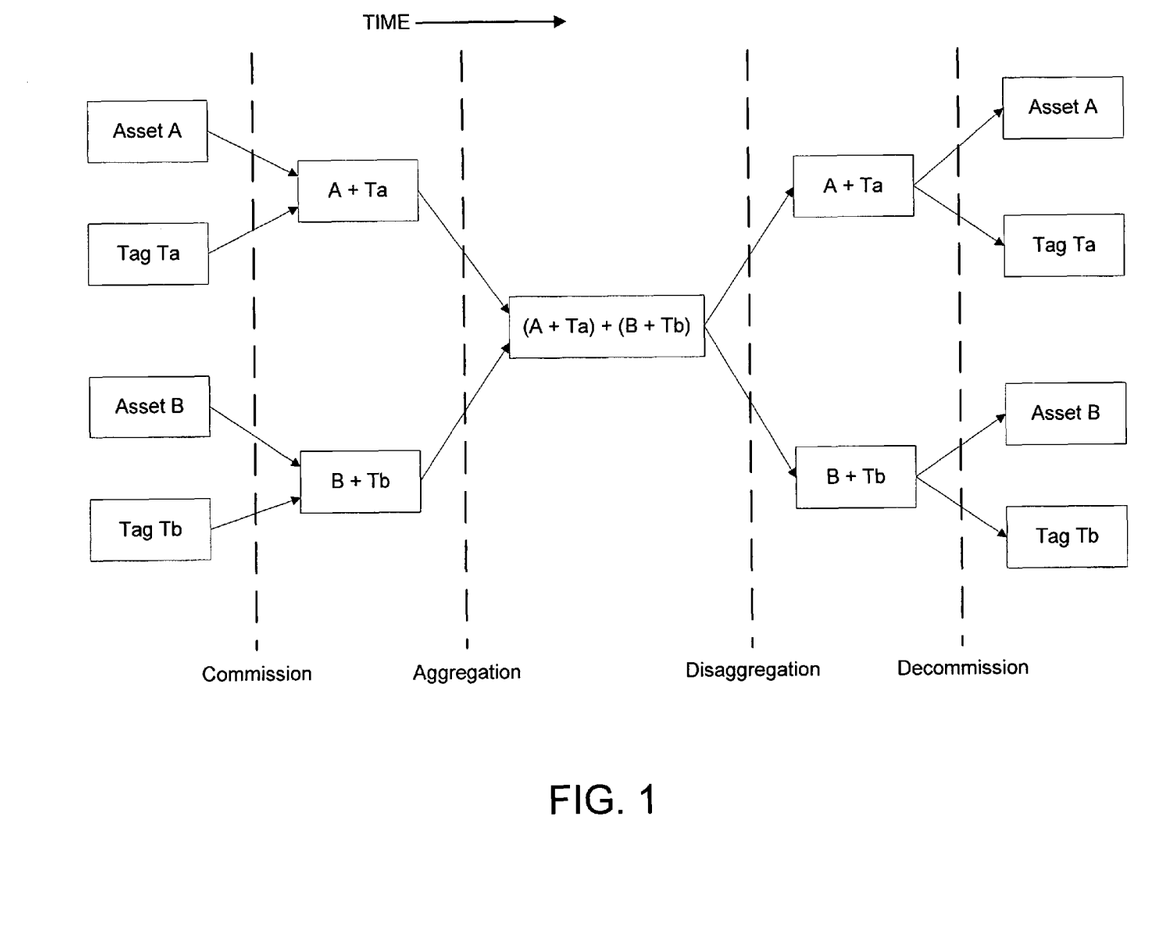
FIG. 1 is a diagram illustrating state and state transitions for assets and tags according to the present invention.

In an asset management system, assets are combined with tracking devices such as radio frequency identification (RFD) tags. The associated asset management system and/or the associated tags have or maintain a variety of states based on the processing and transfer of the asset. A typical state lifecycle for such assets including the states and state transitions is shown in FIG. 1. FIG. 1 illustrates the different states and state transitions over time moving from left to right in the figure. Initially, there are tags and assets such as tags Ta, Tb and assets A and B. In a process referred to as commissioning, the tags are associated with assets. For example as shown in FIG. 1, Asset A is commissioned by associating it with tag Ta such that any movement or change of state will happen to entity "A+Ta." Similarly, Asset B is commissioned by associating it with tag Tb to produce "B+Tb." It should be understood that there are two acts of commissioning that are completely independent, and that they need to be done, but can be done for different assets at the same time. Although shown with a single tag, commissioned assets can have zero, one or more tags. Once an asset has been commissioned, it may be aggregated with other commissioned assets. Again as shown in FIG. 1 by way of example, commissioned asset "A+Ta" can be aggregated with commissioned asset "B+Tb" to produced the aggregation "(A+Ta)+(B+Tb)." Aggregations can involve many more assets and/or tags than that shown, and may be performed incrementally over time or all in one big transaction. The process of disaggregating an asset group divides it into two or more commissioned assets such as shown in FIG. 1 with the transition from "(A+Ta)+(B+Tb)" back to two assets "A+Ta" and "B+Tb." The process of decommissioning further disassociates the tag from the asset to convert the commissioned asset "A+Ta" back to a tag Ta and an asset A, and similarly for "B+Tb" to a tag Tb and an asset B. Similar to commissioning, decommissioning need not occur at the same time for different assets A, B. The key is to understand that with the present invention, the business state of tags Ta and Tb is incremented at each commission, decommission, aggregation and disaggregation state transition. In one embodiment, the state is an integer which is incremented at every (de)commission and (dis)aggregation or other state transition. Other representations of state are also very possible as will be understood to those skilled in the art.

As described above, messages about different assets may in fact be messages about the same aggregate. For example, messages about two different assets might both refer to the same logical aggregation that comprises the pair. Because both messages would cause the location of both assets to be updated, this could cause possible conflicts between locks on the rows needed for each change. Using this simple example of just two assets changing location concurrently, it is easy to see how concurrent change in location or other state of many assets, as is common in processing large shipments of assets, could cause major locking conflicts and likely deadlocks.

Partial Order Message Processing

Figure 2:
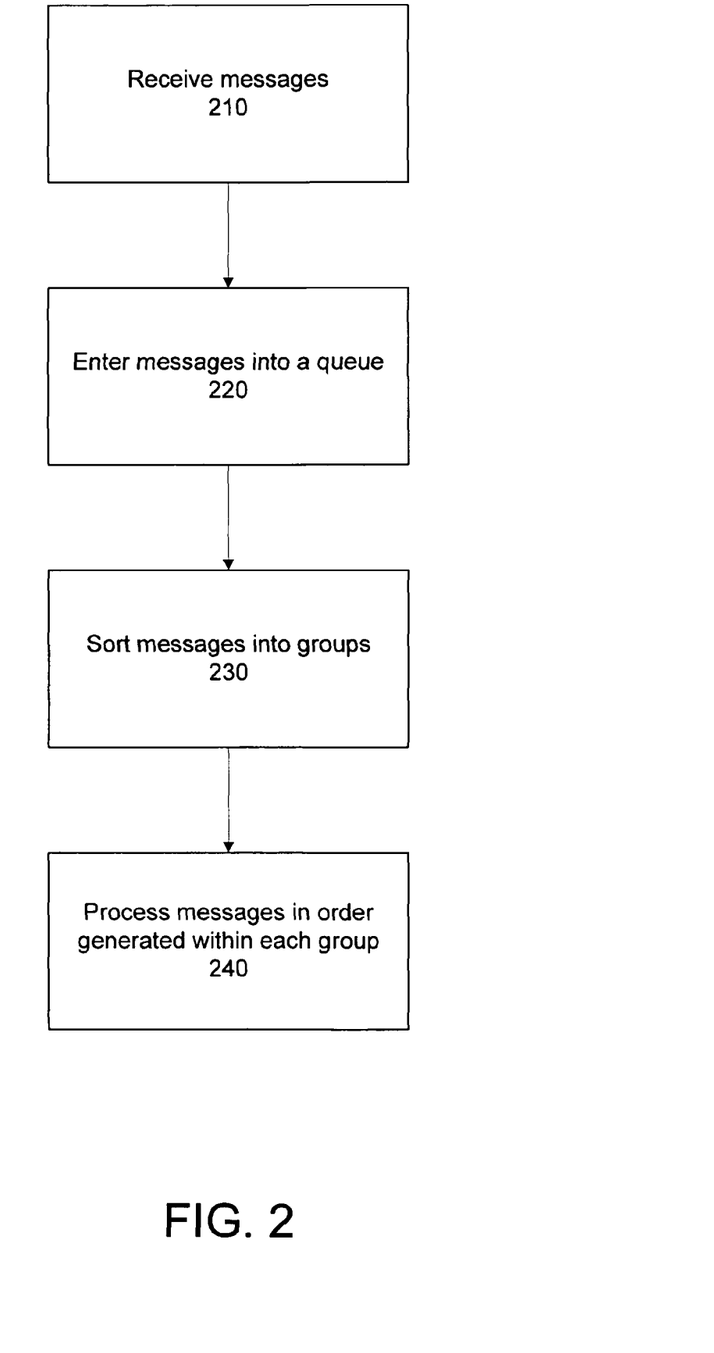
FIG. 2 is a flowchart illustrating a method of efficient message processing in an asset management system using a partial ordering queue according to one embodiment of the present invention.

FIG. 2 is a flowchart illustrating a method of efficient message processing in an asset management system using a partial order message queue according to one embodiment of the present invention. Initially, the asset management system receives 210 messages from an information feed. The information feed may include data from one or more locations and one or more devices such as a tag reader or similar device. In one embodiment, each message includes a state identifier, which may indicate the business state of the tag. The messages received may be of several different types, for example, state update messages and state-independent messages. State update messages indicate that the business state of the tag has changed in relation to other assets. For example, the association (commission) of a tag to an asset, a disassociation (decommission) of a tag to an asset, and aggregation or disaggregation of assets with which the tag is associated. State-independent messages are messages for which the business state of the tag in relation to other assets has not changed. For example, these messages include movement of assets, sensor log updates, and certain status updates. State-independent messages may be processed in any order.

Once received, messages are entered 220 into a message queue. In one embodiment, the message queue is a standard first in, first out (FIFO) queue. Next, the messages are sorted 230. In one embodiment, the messages are sorted into groups by business entity with which the messages are associated; in another embodiment, messages are sorted into groups by aggregations with which the messages are associated. Recall that an aggregation includes assets that are related to one another. This aspect of the present invention is advantageous because it separates the messages into groups of messages that process related data, so that messages that are likely to initiate locks on the same rows can be identified.

Next, within each group from the sort step 230, the subset of messages in the group are processed 240 in the order generated by the information feed. In one embodiment, the processing includes ascertaining whether the message is a state update message or a state-independent message. State update messages need to be processed in the order received, for the reasons described above. State-independent messages, on the other hand, may be processed in any order following the state update message to which they correspond. In an alternate embodiment, the state-changing messages are not separated from the state-independent messages as long as those messages that change state include both the old and the new states, or allow the server to correctly calculate them. One embodiment of steps 220-240 is described in greater detail in conjunction with FIGS. 3 and 6.

This partial ordering aspect of the present invention is advantageous because it provides concurrent processing of unrelated messages that update different rows of the database with greater throughput, and eliminates the problems caused by locking.

In an alternate embodiment, the method may also be modified to process message predicates as will be described below in detail with reference to FIG. 4. A Message Predicate is a piece of logic that may be attached to a message by as it is received 210. The Message Predicate comprises an expression that reduces to a Boolean value. When the message is processed 240, the Message Predicate is evaluated, and if true processing of the message continues. However, if the Message Predicate is evaluated and found false, the message is held in the partial order message queue and may hold other messages in the partial order queue behind it from further processing.

Early/Late Message Processing

In addition to partial order message processing described above, the present invention also detects and holds "early" messages until their corresponding late messages are delivered, and processes "state update" and "state independent" messages differently.

Figure 5:
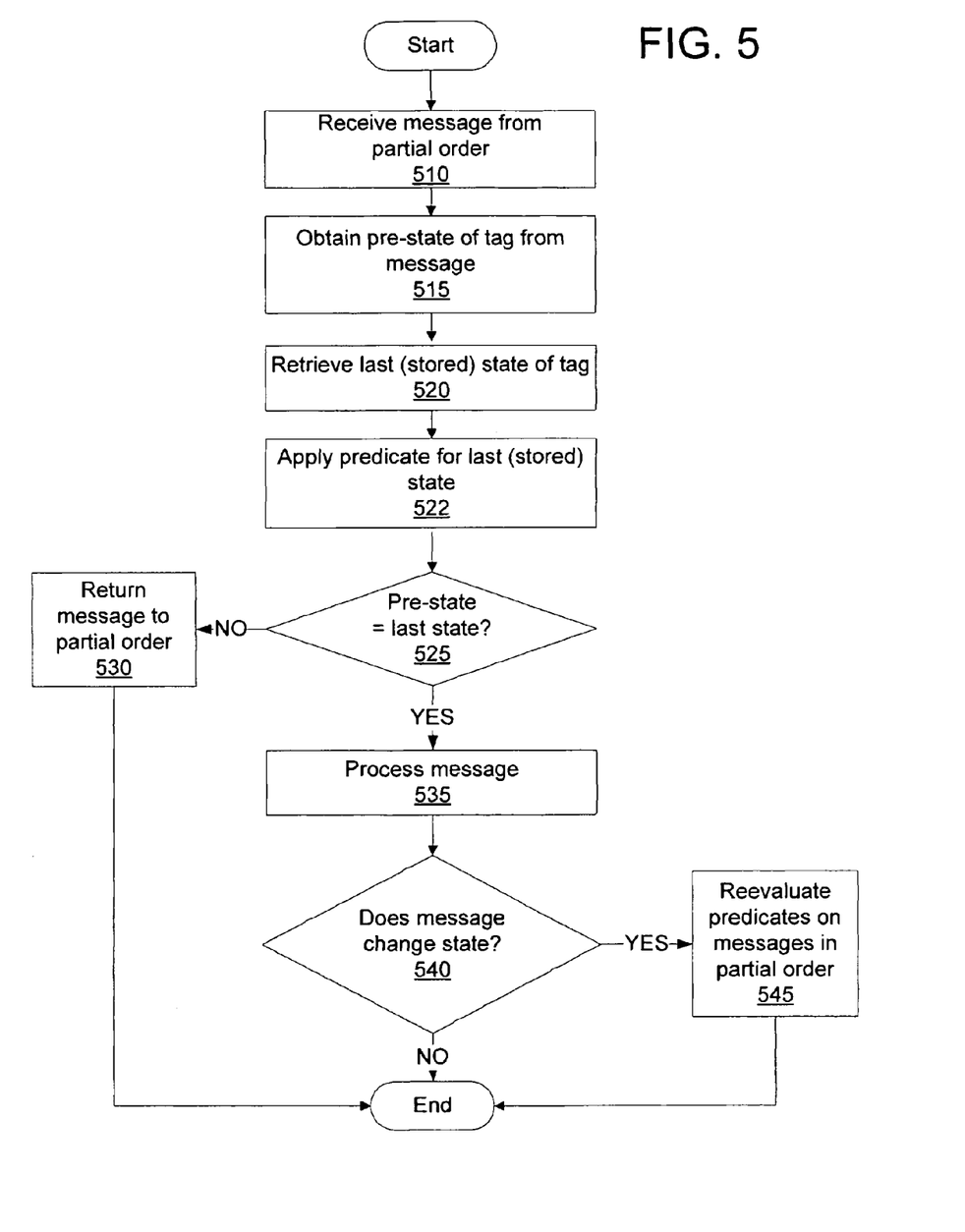
FIG. 5 is a flowchart illustrating a method of efficient message processing in an asset management system using early/late message handling according to one embodiment of the present invention.

FIG. 5 is a flowchart illustrating a method of efficient message processing in an asset management system using early/late message handling according to one embodiment of the present invention. In general, the method determines whether messages have been received in order, such as by using the state identifier of each message to determine the actual business state for the associated tag, retrieving the business state as stored by the system, and comparing the actual business state and stored business state. If the states do not match, the system knows one or more message(s) are missing. If messages are missing, the system should delay processing of a message and all messages generated by the information feed after the message typically until the missing messages arrive. In one embodiment, such processing delays are limited by a time-out rule. For example, the rule may be that if a message has been waiting to be processed for t hours, alert the user.

Referring now to FIG. 5, one embodiment of a method for "early/late message" identification and processing of messages associated with an asset is shown. The method of the present invention operates in a system in which: 1) the tag has an identifier of its state such as a counter as has been described above, 2) the state of the tag is sent with every tag read, and 3) every time a business state change occurs on the tag, or the assets associated with it, the state is changed, and 4) a message that changes the state includes a way for the server to know or determine both the state of the tag before the transaction and the state afterwards. In the depicted embodiment, the logic is for the dequeuing of messages for a single partial order or queue.

The method begins by receiving 510 a message from a partial order. Next, the pre-state of the tag associated with the message is obtained 515. The pre-state of the tag is the state of the tag prior to processing of the message. For state-changing messages, the pre-state tag information is contained within the message itself, or the message includes information that allows the pre-state to be calculated. For state-invariant messages, the message includes the single state, which is used as the pre-state in this step. Then, the last stored state of the tag is retrieved 520. The last stored state is the last known, or at least the last processed state as stored in the database. In addition, a predicate is applied 522 to the message indicating the last stored state of the tag.

It is then determined 525 whether the pre-state of the tag is the same as the last state of the tag. If it is not the same, this indicates that the messages were received out of order, and the message is returned 530 to the partial order or queue from which it was received and the process ends. If it is the same, then the message was received in order and the message is processed 535. After processing 535, it is determined 540 whether the message is a state-changing message. If it is not a state-changing message, no further processing is required. If it is a state-changing message, then the partial order reevaluates 545 predicates on messages in the partial order, and the process ends. These steps happen in turn for all other messages in the partial order.

The present invention advantageously stores the message in a queue and time stamps the message so that messages can be processed in the correct order (rather than the alternative of processing incorrectly then attempting to "patch up" errors and omissions, and to take back alerts and reports featuring the invalid conclusions). In an alternate embodiment, the system also stores a time stamp with the message when it is placed in the queue. Periodically, the system checks for messages that have been in the queue for more than a predetermined amount of time. If a message is queued for more than, for example 2 days, an alert is issued to the user who may then update the system so that the system now accepts the unknown state of the message.

These aspects of the present invention are advantageous because they guarantee correct ordering of all messages related to the same object or asset. This is important because there is a significant amount of denormalized information in the asset tracking system, and immediately upon processing a message, the system issues alerts about important or invalid business states; these alerts are essentially an external representation of the denormalized information. Much of the denormalized information is about the implied relationships between assets and tags, and the movement of a tag is imputed to mean the movement of the assets to which it is related and affects/depends on this denormalized data. Thus if the denormalized data is incorrect, due to the unprocessed message that has yet to arrive, the processing of later messages will necessarily lead to an invalid state and invalid events being sent outside the system.

While the text above describes the partial order queue and the early/late message handling as separate processes each of which could be used individually, those skilled in the art will realize that these processes also may be combined into a single process that provides high concurrent throughput, correct order processing, and further processing efficiencies.

Figure 4:
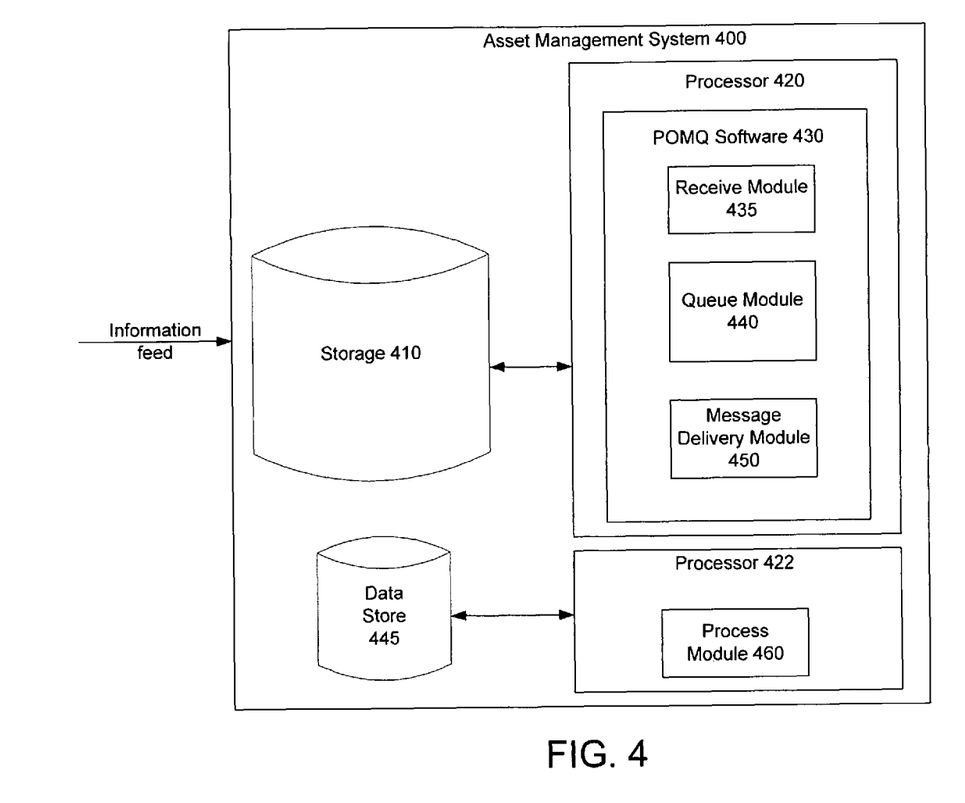
FIG. 4 is a block diagram of a portion of an asset management system according to one embodiment of the present invention.

Referring now to FIG. 4, it shows a block diagram depicting an asset management system 400 for efficient message processing according to one embodiment of the present invention. The asset management system 400 includes one or more storages 410, 445 and one or more processors 420, 422, and receives messages from an information feed.

The storages 410, 445 can be any volatile or non-volatile memory device capable of storing program instructions and/or data. The storages 410, 445 are communicatively coupled to the respective processors 420, 422. In one embodiment, the storage 410 includes state information about the business state of tags associated with received messages.

The processors 420, 422 each comprise, for example, a CPU (central processing unit), a mobile CPU, a controller, or other device to execute instructions. In one embodiment, the processor 420, 422 includes partial order message queue (POMQ) software 430. The POMQ software 430 is controlled by the processor 420 and is responsible for orchestrating many of the processes performed by the system 400 according to the methods of the present invention. In one embodiment, a process module 460 is software controlled by processor 422.

The process module 460 is a software module that processes the message, for example updating the asset's state, location, etc. The process module 460 is coupled to the processor 422. The process module 460 is preferably on a different processor than the POMQ software 430 and the process module 460 is typically multithreaded. In an alternate embodiment the process module 460 and the POMQ software 430 may be on the same processor 420, 422.

The POMQ software 430 executes the method described above with reference to FIGS. 2, 3, 5, and 6 and includes a receive module 435, a queue module 440, and a message delivery module 450.

The receive module 435 provides logic for receiving messages from an information feed. As will be described below the receive module 425 may also add message predicates to messages. These message predicates do not affect state, but control how the partial order message queue processes the messages.

The queue module 440 provides logic for entering messages into a message queue and logic for sorting the messages. In one embodiment, the messages are sorted into groups by the business entity with which the messages are associated; in another embodiment, messages are sorted into groups by aggregations with which the messages are associated. The queue module 440 may interact with other aspects of the system 400 to ascertain business entity or aggregation information. The queue module 440 is described in greater detail in conjunction with FIG. 6.

The message delivery module 450 provides logic for processing the messages. Processing messages may involve, in some embodiments, steps such as described above in conjunction with FIGS. 2 and 5. The message delivery module 450 may interact with the storage 410 for accessing business state information as stored therein.

In an additional embodiment, the message delivery module 450 processes and evaluates Message Predicates. As has been noted above, a Message Predicate is a piece of logic attached to a message by the Receive Module 435, and comprises an expression that reduces to a Boolean value. The message delivery module 450 is the only part of the system that evaluates Message Predicates. In one embodiment the evaluation is done the moment that the message becomes the head of a partial order (i.e., the message in the partial order that will be delivered next). If the Message Predicate evaluates to true (or is not present), the message is delivered without delay. If, however, the Message Predicate evaluates to false, then the Message Delivery module 450 holds the message in the partial order. In other words, the message is held back, holding all messages behind it in the partial order.

If further messages are delivered into the same Partial Order, and are sorted behind the held message, the overall state does not change and the partial order is still on hold.

If, however, another message is delivered into the partial order in front of the held message, then a) the new message's predicate is evaluated, and b) the evaluation of the previous head message's predicate is invalidated.

Assuming that the new message has a positive (true) evaluation, then it will be delivered forthwith. When processed, the previous head message will become the head again, and the predicate will be re-evaluated. The re-evaluation might now return true, and if so, the previously held message will be delivered for processing.

In the event that two messages share exactly the same timestamp, the system may choose additional fields to provide ordering or may arbitrarily choose an ordering in various embodiments of the invention.

The operation of predicates can be better understood through the following example, which aligns with the process described in conjunction with FIG. 5. Suppose we have an asset, A, that is commissioned to tag Ta, then moved past a choke point. Two messages will be sent to the asset management system:

Message one (M1): Associate Asset A and Tag Ta, State S1->S2

Message two (M2): Ta moves past chokepoint C1, State S2

Further, let us suppose they are delivered out-of-order to the partial order message queue 455, so M2 arrives early, and M1 is late. M2 arrives, and the receive message module 435 posts the message applying a predicate "Tag's database state==State S2." This is sorted into the Partial Order for Asset A, and becomes the head. The message delivery module 450 evaluates the predicate. Because the database state holds the value Tag Ta==State 51, the predicate evaluates to false, and the queue is halted.

Now Message M1 arrives, and the receive module 435 posts the message applying a predicate "Tag's database state==State S1." It is temporally earlier than Message M2, so is sorted to the head of the partial order. The message delivery module 450 evaluates the predicate, which returns "true." The message is delivered and processed. In addition, the state of tag Ta is updated to State S2.

After processing, the message delivery module 450 re-evaluates the predicate on M2. This will now evaluate to true, and Message M2 is delivered.

The above-described software portions 435-450 need not be discrete software modules. The configuration shown is meant only by way of example; other configurations are contemplated by and within the scope of the present invention.

Figure 3A:
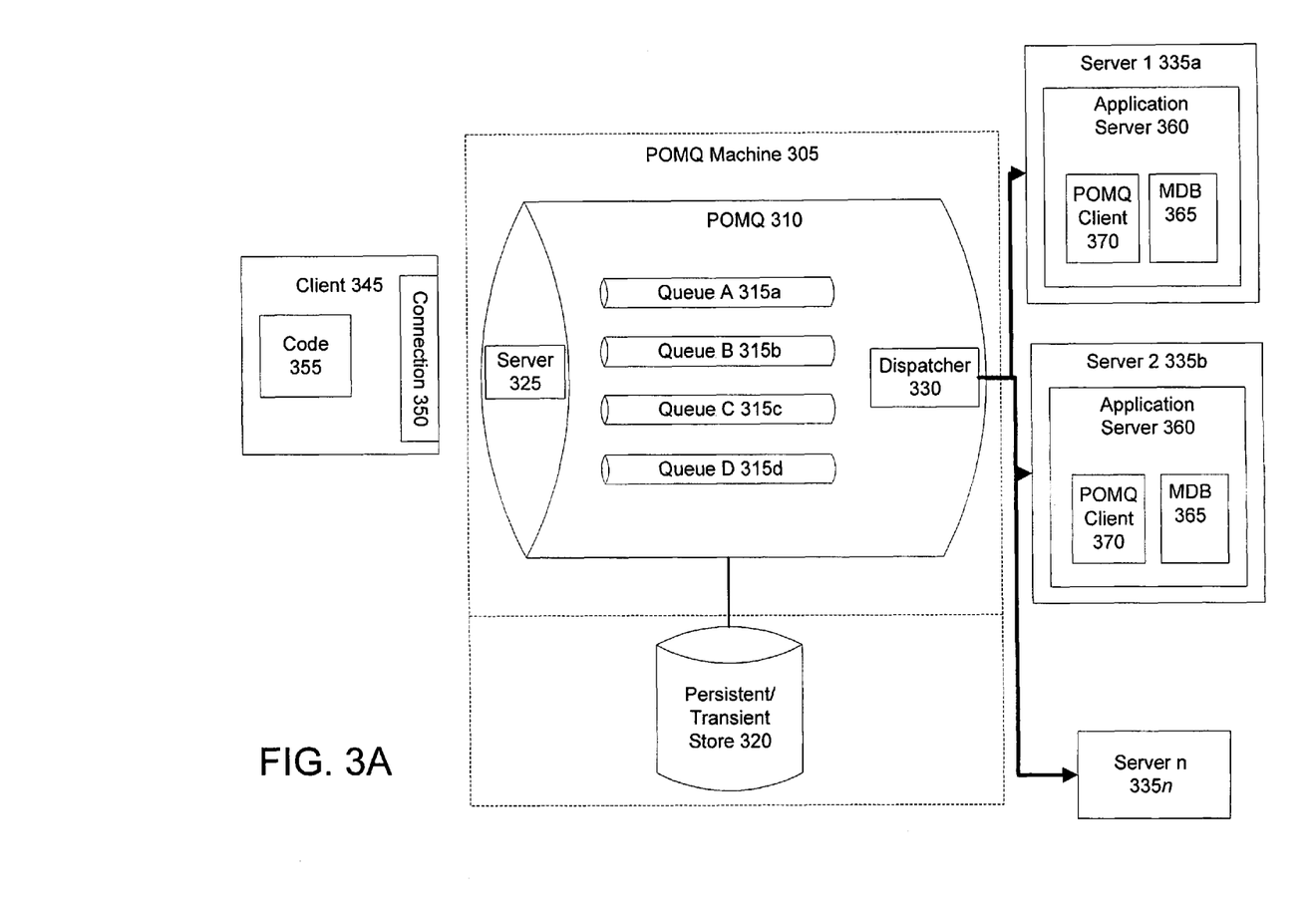
FIGS. 3A-B show a schematic of the partial order message queue logical entity according to one embodiment of the present invention.
Figure 3B:
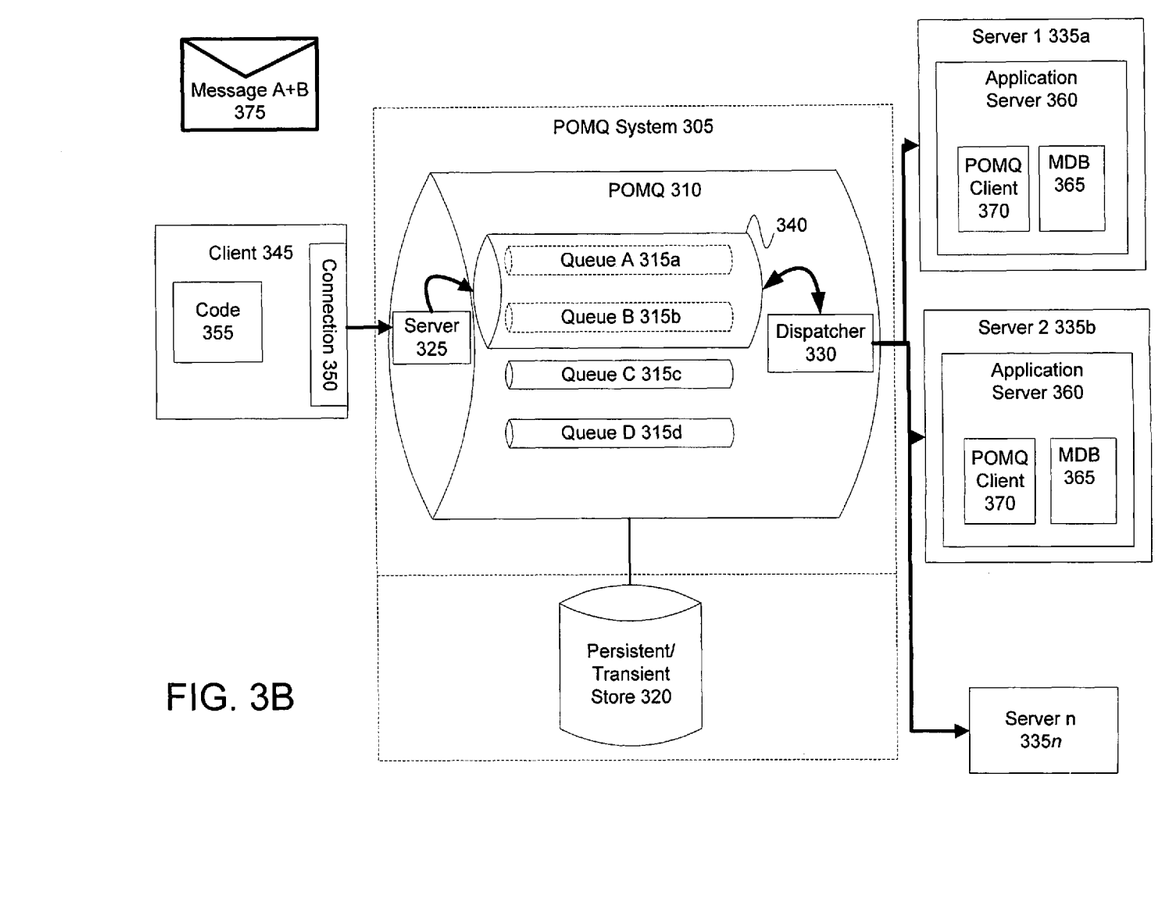

Referring now to FIGS. 3A-B, they show a schematic of a partial order message queue logical entity according to one embodiment of the present invention. FIGS. 3A-B show the partial order message queue (POMQ) logical system 305 as well as the path of a message 375 about two related assets, A and B, depicted by a thick arrows in FIG. 3B.

The POMQ system 305 is a logical entity that can be conceptualized as a larger POMQ 310, with several smaller queues 315 inside. The POMQ system 305 is communicatively coupled to a persistent/transient store 320. In one embodiment the persistent/transient store 320 is included in the POMQ system 305, or is separate from the POMQ system 305 in another embodiment, as indicated by the dotted border. The POMQ 310 is configured to receive messages about assets, e.g., assets A-D in this example, at a server 325, which posts multi-threaded messages to the POMQ 310. The POMQ 310 also is configured to send multi-threaded messages to servers 335 via a dispatcher 330. The dispatcher 330 also may send information to various queues within the POMQ 310. Messages about asset A are processed by queue A 315a, messages about asset B are processed by queue B, etc.

The POMQ 310 receives its messages from one or more clients 345 via a connection 350. The client code 355 creates and posts the messages to the POMQ 310. The POMQ 310 dispatches messages to one or more servers 335. Each server 335 includes an application server 360. Each application server 360 includes a message driven bean (MDB) 365 and a POMQ client 370 in one embodiment. An MDB 365 is an Enterprise Java Bean similar to a session bean, except it responds to messages delivered by a message queue implementing the Java Messaging Service (JMS) API. A POMQ client 370 is a Java Connector Architecture (JCA) Resource Adapter, which polls for messages from the dispatcher 330, and delivers them to the MDB 365.

FIG. 3B also shows the path of message A+B 375, depicted by thick arrows. Message A+B 375 is a message about two related assets, A and B. When processing messages about a single asset, e.g., any of assets A-D, the messages are processed by their respective queues A-D 315. However, when a joint message, e.g., a message about assets A and B is received, existing methods of processing the joint message are either correct but slow (e.g., using a single queue) or are concurrent but incorrect or inefficient (e.g., using multiple queues, one for each asset). Thus, when a message about more than one asset, e.g., message A+B, enters the POMQ 310, the message must be processed in a way that takes both queue A 315a and queue B 315b into account to avoid such problems.

Figure 6:
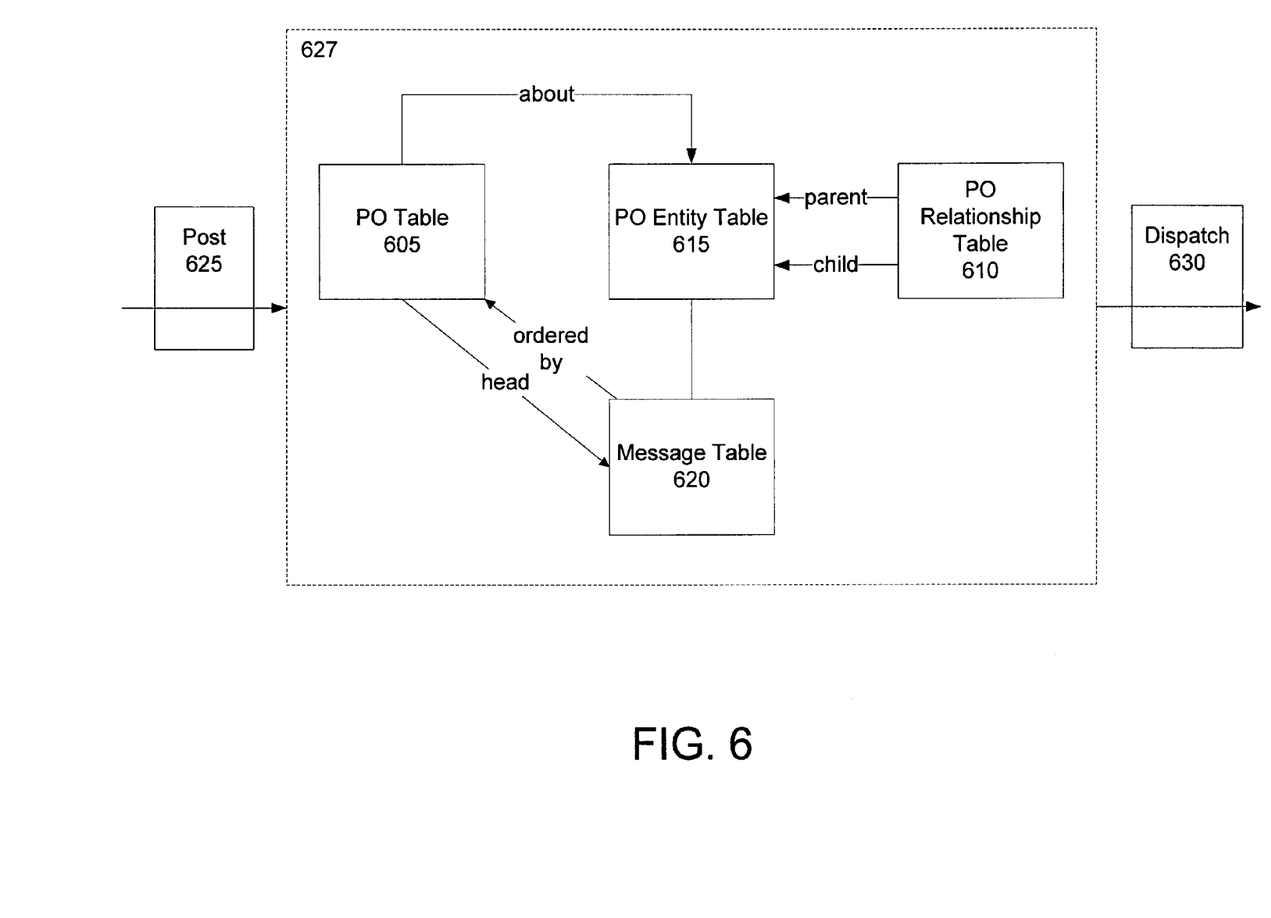
FIG. 6 shows a schematic of one implementation of partial order message queue logic for managing partial orders according to one embodiment of the present invention.

The POMQ 310 is configured to determine what, if any, business entities a message is about and to track the relationships between business entities, one embodiment of which is described in greater detail in conjunction with FIG. 6. Thus, when the POMQ 310 receives a joint message (e.g., message A+B 375), it recognizes the message as being about both assets (assets A and B). Once the joint message is received (message A+B), the POMQ 310 continues processing any messages that have already been delivered, but does not allow any new messages to be delivered from the individual queues (queue A 315a or queue B 315b). Once all messages for either individual asset (asset A or B) prior to the aggregation message (message A+B 375) have completed processing, the POMQ 310 joins the individual queues (queue A 315a and queue B 315b) to create a new partial order queue 340. Merging the individual queues (315a, b) continues to provide good concurrency, and efficiency remains improved. Later, the system may receive another message saying that assets A and B have been dissociated, this disaggregation message (A-B). This is placed into queue 340; at a later time the message will be processed by one of the MDB's 365. After message (A-B) has been completely processed by an MDB 365, the POMQ 310 dissociates the partial order queue 340 back into separate queues 315a, b. Then, the messages are dispatched to the server(s) 335.

In various embodiments, different numbers of individual queues 315 may be joined and dissociated according to joint multi-threaded messages received. For partial order queues merging greater than two individual queues, one or more queues may be joined or dissociated to accommodate joint messages for less than all members of the joint queue. For example, for a message relating to Assets A, B, and C, the three corresponding queues, Queues A, B, and C 315a-c, may be joined. If a message is later received relating to Assets B and C, but not A, Queue A 315a can be dissociated from the joined queue.

Referring now to FIG. 6, it shows a schematic of one implementation of partial order message queue logic for managing partial orders according to one embodiment of the present invention. FIG. 6 shows three logical processes: posting 625, managing partial orders 627, and dispatching 630. Multi-threaded posting 625 and dispatching 630 are accomplished using known techniques, which will not be discussed in detail herein.

One implementation of a logical process of managing partial orders 627 is shown. The process uses a series of tables that interact: a partial order (PO) table 605, a PO relationship table 610, a PO entity table 615, and a message table 620.

The PO table 605 includes a list of partial orders. Each row of the PO table 605 is mini-queue of messages that relate to the PO Entity 615, and the maximum concurrency for the PO table 605 is its number of rows. When a message is posted, the PO table 605 disables all rows (mini-queues) the message will touch. Thus, the PO table 605 allows messages in process to complete, but allows no new messages to be dispatched from those partial orders.

The PO entity table 615 includes one row for each distinct entity, listed by the name of the entity. Examples of entities in the PO entity table 615 include tags, assets, documents, consignments, shipments, etc. The PO entity table 615 is a logical 'horizontal' extension of the PO Table 605 where each row on the PO Table 605 maps to one row on the PO entity table 615 and vice versa. In this embodiment, the table has been separated to allow different processes such as Post 625 and Dispatch 630 to be updating different fields of the same logical row without incurring the locking penalties that might be imposed if they were physically on a single table.

The PO relationship table 610 lists existing relationships between business entities and relationships that will occur later in the system. When a new relationship is added to the PO relationship table 610, it is listed in the PO relationship table 610 as "pending." Rows in the PO relationship table 610 represent edges in a graph where the nodes are represented by rows in the PO entity table 615/PO table 605. Within the set of all PO entity table 615 rows, there are subsets defined by nodes that are mutually reachable via the edges defined in PO relationship table 610. In a typical dataset in an asset management system, are a large number of subsets with a small number of members. As can be seen from FIG. 6, each row in Message table 620 is related to a single row in the PO entity table 615, which in turn places the row in the Message table 620 in a single subset of rows in the PO table 605. All messages in every subset are totally ordered with respect to other members of the subset. Therefore, each subset of mutually reachable rows on the PO entity table 615 define partially ordered subsets of messages on the Message table 620, and, referring to FIG. 3, therefore the logical queues in POMQ 310 such as 340, 315*c* and 315*d*.

The message table 620 lists the messages processed.

Upon enqueue of a message about greater than one business entity, the following processes occur. First, the message is inserted, e.g., via post 625. Next, it is determined whether the current PO entity table 615 is missing any partial order entities for the message, and if so, a new entity is added to the PO entity table 615 and the proposed relationship is identified for the PO relationship table 610. Then, all rows in the PO table 605 corresponding to the message are disabled.

If FIG. 6 is implemented in a database embodiment, there will be significant database contention on the various tables caused by the many different Post 625 and Dispatch 630 processes; this contention can cause a bottleneck limiting the maximum throughput of the system. This contention is caused by the fact that both the act of processing and of dispatching requires rows to be updated on all four tables 605, 610, 615, and 620. Because each update needs to be transactional, both posting and dispatching therefore require locking all associated rows on all tables.

Various heuristics may be used to reduce this contention and thus increase system throughput. Some heuristics take advantage of the fact that there are typically many more partial orders available to deliver messages than there are threads to process them. Given this condition, partial orders can be disabled, i.e., can be ignored by the dispatcher 630, for short periods of time without reducing system throughput.

Further, database insertions are rarely contentious whereas row deletions and updates are. Therefore instead of many processes attempting to update one row, which requires each process to wait in a queue until it becomes that process' turn, it is can sometimes be more efficient for each process to insert a row, and for a single background task to periodically consolidate these rows into a single one.

These two observations can be advantageously combined. For each message being posted into the queue, the Post 625 process inserts a row into the Message table 620. Further, the Post 625 process determines the correct partial order in which the message should be contained. If this is a new partial order, the Post 625 process simply inserts rows into the relevant tables, which does not cause database contention. However, if this message is part of an existing partial order, the Post 625 process simply updates the PO table 605 to disable the partial order; the work to update the PO relationship table 610 and the PO entity table 615 for the message is deferred.

Over time, this approach would disable more and more partial orders, leading to the possibility that there are no enabled partial orders from which messages can be dispatched. This condition would render the system valueless.

Therefore, from time to time, a single process selects all disabled partial orders from PO table 605 and performs all necessary work as described in this invention, including sorting the partial order and computing the predicate for the head message. There are many embodiments of the trigger for this step. One embodiment includes a periodic update heuristic, e.g., every X seconds. Another embodiment includes a numeric update heuristic, e.g., is the step is triggered every Y messages. Yet another embodiment is triggered whenever there are insufficient enabled partial orders. In addition, other embodiments use a combination of the above triggers. Those skilled in the art can readily implement these and other triggers.

FIG. 6 may also be embodied in 3GL or Object Oriented programming languages such as C, C++, and Java. In these embodiments, row locking may be achieved more efficiently than on a database by using mutex locks, semaphores or similar algorithms.

Upon dispatch of the message, the following occurs. The system searches for and chooses an enabled row in the PO table 605. Then the "head" (next in sequence) message is chosen and the pending message is processed. Finally, a new head is set. In one embodiment, is doesn't matter which row in PO table 605 is chosen. In other embodiments, several rows can be chosen, and several messages dispatched, simultaneously. In another embodiment, the 'best' row in PO table 605 is chosen, wherein 'best' is defined as the partial order with the most important or the oldest message. In other embodiments, other calculations of 'best' are used, as will be understood to those skilled in the art.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of handling out of order messages in an asset management system, the method comprising:
   receiving messages from a queue, each message associated with a tracking device coupled with an asset tracked by the asset management system;
   determining from the queue a first message associated with a first asset tracked by the asset management system, the first message including a pre-state of the first tracking device;
   retrieving a last stored state of the first tracking device;

determining whether the pre-state of the first tracking device matches the last stored state of the first tracking device;

responsive to a determination that the pre-state and last stored state match, processing the first message;

determining whether processing the first message associated with the first tracking device changes the last stored state of the first device;

responsive to a change in the last stored state caused by processing of the first message, evaluating a second message in the queue to determine whether the second message is suitable for processing, wherein the second message is associated with a predicate and evaluating the second message comprises evaluating the associated predicate to determine whether the second message is suitable for processing; and responsive to a determination that the pre-state and last stored state do not match, returning the first message to the queue.

2. The method of claim 1, wherein determining whether the pre-state of the first tracking device matches the last stored state of the first tracking device comprises evaluating a predicate associated with the first message.

3. The method of claim 1, further comprising: responsive to returning the first message to the queue, delaying processing of the first message.

4. The method of claim 3, wherein the delaying is limited by a time-out rule.

5. The method of claim 4, wherein the time-out rule limits the delaying to three days.

6. An apparatus for handling out of order messages in an asset management system, the apparatus comprising:
a processor configured to execute instructions for one or more modules including:
a receive message module for receiving messages from a queue, each message associated with a tracking device coupled with an asset tracked by the asset management system;
a message delivery module for
determining from the queue a first message associated with a first asset tracked by the asset management system, the first message including a pre-state of the first tracking device,
retrieving a last stored state of the first tracking device,
determining whether the pre-state of the first tracking device matches the last stored state of the first tracking device,
responsive to a determination that the pre-state and last stored state do not match, returning the first message to the queue;
determining whether processing the first message associated with the first tracking device changes the last stored state of the first device;
responsive to a change in the last stored state caused by processing of the first message, evaluating a second message in the queue to determine whether the second message is suitable for processing, wherein the second message is associated with a predicate and the processor is configured to execute instructions for the message delivery module that further includes instructions for evaluating the second message, the instruction further comprising evaluating the associated predicate to determine whether the second message is suitable for processing; and
a message queue for processing the first message responsive to a determination that the pre-state and last stored state match.

7. The apparatus of claim 6, wherein determining whether the pre-state of the first tracking device matches the last stored state of the first tracking device comprises evaluating a predicate associated with the first message.

8. The apparatus of claim 6, wherein the processor is configured to execute instructions for the message queue that further includes instructions for delaying processing of the first message responsive to the message delivery module returning the first message to the queue.

9. A non-transitory computer readable storage medium storing instructions thereon, the instructions when executed by a processor cause the processor to:
receive messages from a queue, each message associated with a tracking device coupled with an asset tracked by the asset management system;
determine from the queue a first message associated with a first asset tracked by the asset management system, the first message including a pre-state of the first tracking device;
retrieve a last stored state of the first tracking device;
determine whether the pre-state of the first tracking device matches the last stored state of the first tracking device;
responsive to a determination that the pre-state and last stored state match, process the message;
determine whether processing the first message associated with the first tracking device changes the last stored state of the first device;
responsive to a change in the last stored state caused by processing of the first message,
evaluate a second message in the queue to determine whether the second message is suitable for processing, wherein the second message is associated with a predicate and the instructions for evaluating the second message when executed by the processor further cause the processor to evaluate the associated predicate to determine whether the second message is suitable for processing; and
responsive to a determination that the pre-state and last stored state do not match, return the first message to the queue.

10. The non-transitory computer readable storage medium of claim 9 wherein the instructions for determining whether the pre-state of the first tracking device matches the last stored state of the first tracking device further comprise instructions when executed by the processor further cause the processor to: evaluate a predicate associated with the first message.

11. The non-transitory computer readable storage medium of claim 9 wherein the instructions when executed by the processor further cause the processor to: responsive to returning the first message to the queue, delay processing of the first message.

12. The non-transitory computer readable storage medium of claim 11, wherein the delaying is limited by a time-out rule.

13. The non-transitory computer readable storage medium of claim 12, wherein the time-out rule limits the delaying to three days.

* * * * *